United States Patent [19]
Rader

[11] Patent Number: 6,000,363
[45] Date of Patent: Dec. 14, 1999

[54] LOW WASTE ANIMAL DRINKING CUP OR BOWL

[75] Inventor: Helmut Rader, Heppenheim, Germany

[73] Assignee: Monoflo International, Inc., Winchester, Va.

[21] Appl. No.: 09/161,989

[22] Filed: Sep. 29, 1998

[30] Foreign Application Priority Data

Dec. 23, 1997 [DE] Germany ............................ 297 22 663

[51] Int. Cl.$^6$ .................................................. A01K 7/06
[52] U.S. Cl. ................................ 119/75; 119/74; 119/72.5
[58] Field of Search .............................. 119/74, 75, 72.5, 119/52.1, 61

[56] References Cited

FOREIGN PATENT DOCUMENTS

| | | | |
|---|---|---|---|
| 0043418 | 1/1982 | European Pat. Off. ................. | 119/75 |
| 2578149 | 9/1986 | France ..................................... | 119/75 |
| 2854495 | 6/1980 | Germany ................................. | 119/75 |
| 3820458 | 10/1988 | Germany ............................ | 119/72.5 |
| 295 10 767 | 10/1995 | Germany . | |

OTHER PUBLICATIONS

Echberg Feeding Systems brochure (admitted prior art).
Suevia "The Best Waters" in the World brochure (admitted prior art).
"Drik–O–Mat" brochure of Egebjerg, admitted prior art.
Rotecna Drink brochure, Equipment Management LLC, admitted prior art.
Brochure "Specialty Nipple Drinkers", Monoflo International, Inc., admitted prior art.

*Primary Examiner*—Michael J. Carone
*Assistant Examiner*—Son T. Nguyen
*Attorney, Agent, or Firm*—Nixon & Vanderhye P. C.

[57] ABSTRACT

An animal drinking cup or bowl is provided which is constructed so that water being dispensed from a nipple drinker mounted by the cup or bowl will move to a location remote from the drinker actuator, encouraging the animal to drink from a remote pool of water, and thereby reducing water waste and spillage. A metal cup or bowl body mounts the nipple drinker so that the pin actuator is at a first location, and the cup or bowl body has a slanted bottom portion adjacent the first location and leading to a pool-defining portion at a second location remote from the first location. The second location is preferably sufficiently remote from the first location so that an animal (such as a piglet) using the drinking cup or bowl substantially cannot activate the pin when simultaneously drinking out of the pool-defining portion. The slanted bottom portion may make a substantially uniform angle of about 4–10° with respect to the horizontal, and the pool-defining portion can be at the far front of the drinker, at one side, or at both sides with a center portion from which two bottom portions slant downwardly.

10 Claims, 3 Drawing Sheets

6,000,363

LOW WASTE ANIMAL DRINKING CUP OR BOWL

BACKGROUND AND SUMMARY OF THE INVENTION

The purpose of animal drinking cups or bowls is to deliver water in a hygienic and controlled manner to farm animals so that the farm animals may have as much water as they desire, without wasting or spilling a significant amount of water. In conventional animal drinking cups or bowls, a nipple drinker having an actuator is mounted adjacent the rear of the cup or bowl, and the front of the cup or bowl slants downwardly toward the rear so that a pool of water is provided adjacent the nipple drinker actuator. For certain types of animals, however, such as for piglets, the animal can continuously actuate the nipple drinker while drinking out of the pool. This can cause excess delivery of water, excess spillage, and/or unhygienic conditions.

In the animal drinking cup or bowl according to the present invention the nipple drinker pin actuator is located at a first location, and the cup or bowl body has a slanting bottom (which may be the actual bottom, or in some cases a false bottom) portion slanting downwardly away from the first location to a pool-defining portion of the cup or bowl body at a second location, remote from the first location. In this way it is very difficult for an animal, such as a piglet, to activate the pin actuator while drinking out of the pool of water at the pool-defining portion. Therefore water waste and spillage are minimized, and hygiene is preserved.

According to one aspect of the present invention an animal drinking cup or bowl is provided comprising the following components: A nipple drinker having a pin actuator. A cup or bowl body mounting the nipple drinker so the pin actuator is at a first location. And, the cup or bowl body having a slanted bottom portion adjacent the first location and leading downwardly to a pool-defining portion at a second location remote from the first location. Preferably, the second location is sufficiently remote from the first location so that an animal using the drinking cup or bowl substantially cannot activate the pin actuator while simultaneously drinking out of the pool-defining portion. While the bottom portion (which may be the actual bottom of the cup or bowl body, or a false bottom) may have a wide variety of angles or contours depending upon the particular animal that the drinking cup or bowl is designed to be used with, or for other factors, typically the slanted bottom portion makes a substantially uniform angle between about 4–10° with respect to the horizontal.

The cup or bowl body may have a substantially closed rear and a substantially open front, and the slanted bottom portion may slant from adjacent the rear downwardly toward the front, with the nipple drinker mounted adjacent the rear. The nipple drinker can be mounted with any suitable conventional structure such as brackets, holes formed in the body, etc. Alternatively, where the bowl has substantially closed first and second sides, the slanted bottom portion may slant downwardly from adjacent the first side toward the second side with the pool-defining portion adjacent the second side, and the nipple drinker mounted adjacent the first side, for example on the rear of the cup or bowl body. Alternatively, the slanted bottom portion may slant downwardly from adjacent a center portion of the cup or bowl body toward the first side, and another, second, slanted portion and pool-defining portion may be provided, with the second slanted bottom portion slanting downwardly from the second portion toward the second side, and the second pool-defining portion adjacent the second side.

According to another aspect of the present invention an animal drinking cup or bowl is provided comprising the following components: A metal (e.g. stainless steel) cup or bowl body having a substantially closed rear, first and second sides, and a substantially open front. A substantially closed bottom having a slanted portion making an angle with respect to the horizontal of greater than about 4 degrees, and leading to a pool-defining portion. And, wherein the pool-defining portion is adjacent the front and the slanted portion slanting downwardly from adjacent the rear toward the front.

According to still another embodiment of the present invention, an animal drinking cup or bowl is provided comprising the following components: A metal cup or bowl body having a substantially closed rear and first and second sides, and a substantially open front. A substantially closed bottom having a slanted portion making an angle with respect to the horizontal of greater than about 4 degrees, and leading to a pool-defining portion. And, wherein the pool-defining portion is adjacent the first side, and the slanted portion extends downwardly toward the first side. The slanted and pool-defining portions may be first portions, and the drinking cup or bowl may further comprise a second slanted bottom portion and second pool-defining portion, the second pool-defining portion adjacent the second side; and the first and second slanted portions slanting downwardly from a center portion toward the first and second sides, respectively.

It is the primary object of the present invention to provide an advantageous animal drinking cup or bowl. This and other objects of the invention will become clear from an inspection of the detailed description of the invention, and from the appended claims.

BRIEF DESCRIPTION OF THE DRAWINGS

FIG. 3 is a view like that of FIG. 1 of a second embodiment, while

DETAILED DESCRIPTION OF THE DRAWINGS

Figure 2:
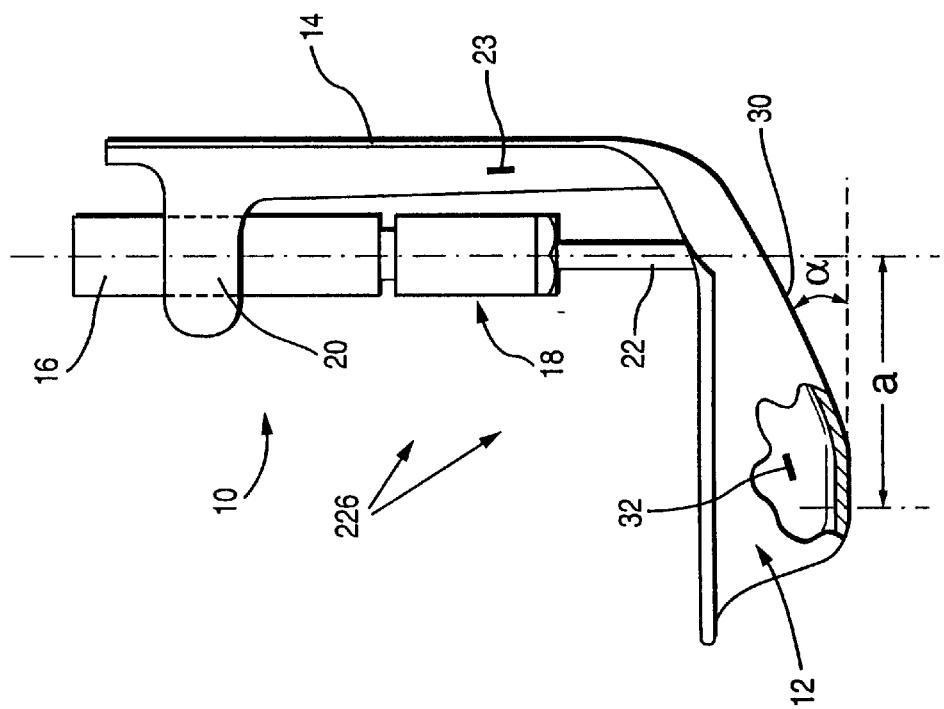
FIG. 2 is a side view, taken along arrow 2 of FIG. 1, of the animal drinking cup or bowl of FIG. 1.
Figure 1:
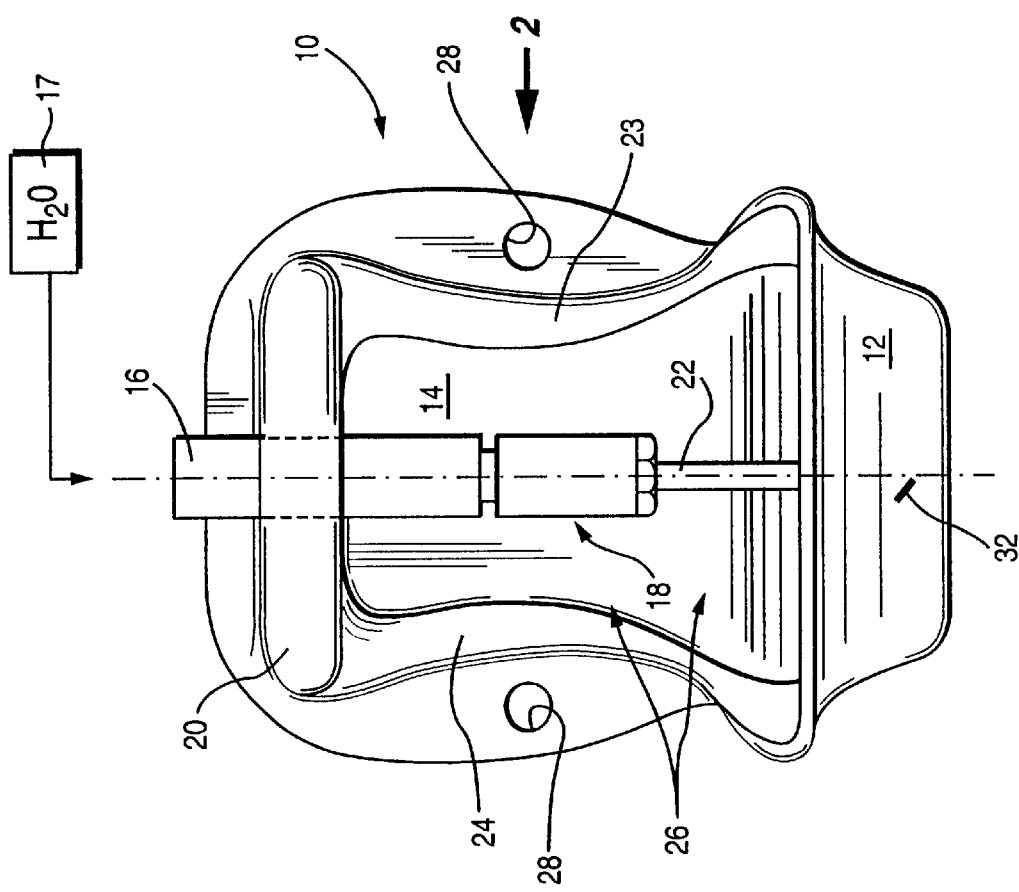
FIG. 1 is a front elevational view of a first embodiment of an animal drinking cup or bowl according to the present invention.

The first embodiment of a animal drinking cup or bowl according to the present invention is shown generally by reference numeral 10 in FIGS. 1 and 2. The animal drinking cup or bowl 10 includes a cup or bowl body 12 which preferably is of metal, such as 304 stainless steel, and having a substantially closed rear portion 14. Mounted on or to the body 12 is a conventional pipe 16 leading to a source of water shown schematically at 17 in FIG. 1. The source of water 17 may be any conventional source of water on a farm, ranch, or the like. Mounted to the pipe 16 is a conventional nipple drinker 18 having a pin actuator 22. In the embodiment illustrated in FIGS. 1 and 2 a collar or bracket 20 extending outwardly from the rear 14 receives the pipe 16 and holds it tightly in place. In the preferred embodiment, the nipple drinker 18 (which may be of the type available from Monoflo International Inc., such as model no. 3505) is preferably mounted so that it is substantially vertical, the pin actuator 22 also being substantially vertical, as illustrated in FIGS. 1 and 2. However the pin actuator can be at an angle to the vertical if desired.

The cup or bowl body 12 also has sides 23, 24, and a substantially open front 26 through which the animal (e.g. piglet) using the drinker 10 may engage the actuator 22 and thereby cause water to flow from the source 17 through the drinker 18 into the cup or bowl 10. Conventional mounting holes 28 may be provided for mounting the cup or bowl drinker 10 (particularly the rear 14 thereof) to a stationary object located at an appropriate height so that the animals to be watered may readily access water in the drinker 10.

A distinguishing feature according to the present invention is the provision of a slanted bottom portion 30 which is adjacent the location of the pin actuator 22 (see FIG. 2), and then slants downwardly toward a pool-defining portion 32 at a second location remote from the first location. Bottom portion 30 is either an actual bottom, or a false bottom. That is a mid-point of the pool-defining portion 32 is spaced a horizontal distance "a" (see FIG. 2) from the pin actuator 22 (first location). The spacing "a" is typically several inches, and preferably long enough so that the pool-defining portion 32 is sufficiently remote from the pin actuator 22 that the piglet or other animal using the drinker 10 cannot activate the pin actuator 22 while simultaneously drinking out of the pool defining portion 32.

The construction described above reduces water waste and spillage, and keeps the water hygienic. The exact dimension "a" and the particular angle α (see FIG. 2) or contour of the slanted bottom portion 30 is not critical as long as these functions are accomplished. However typically the angle α is greater than about 4°, e.g. about 4–10° (preferably about 7°) and is substantially uniform, although in some cases it may have a curvature to it, may be rippled, corrugated, or grooved, may have several differently angled sections, etc.

Figure 4:
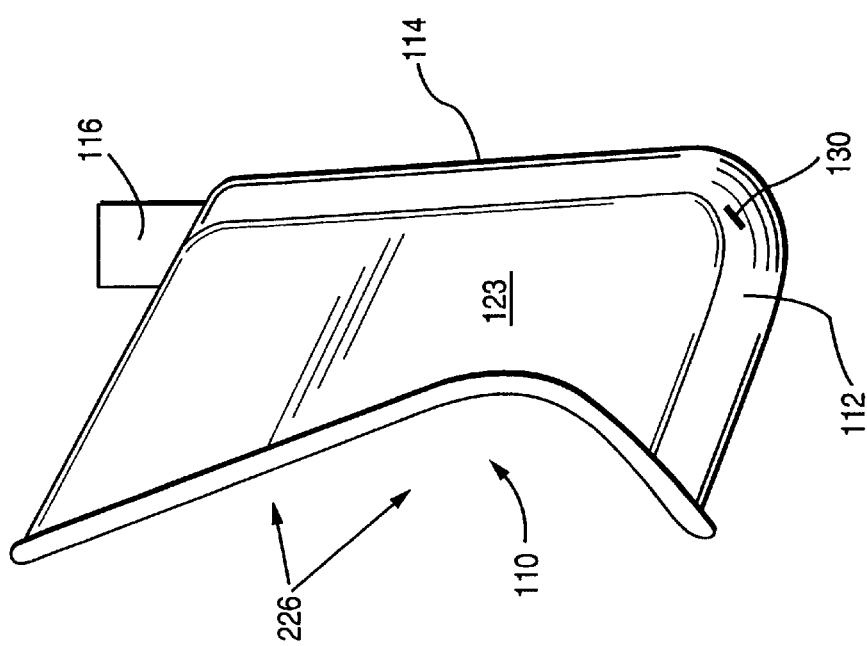
FIG. 4 is a view like that of FIG. 2 of the second embodiment.
Figure 3:
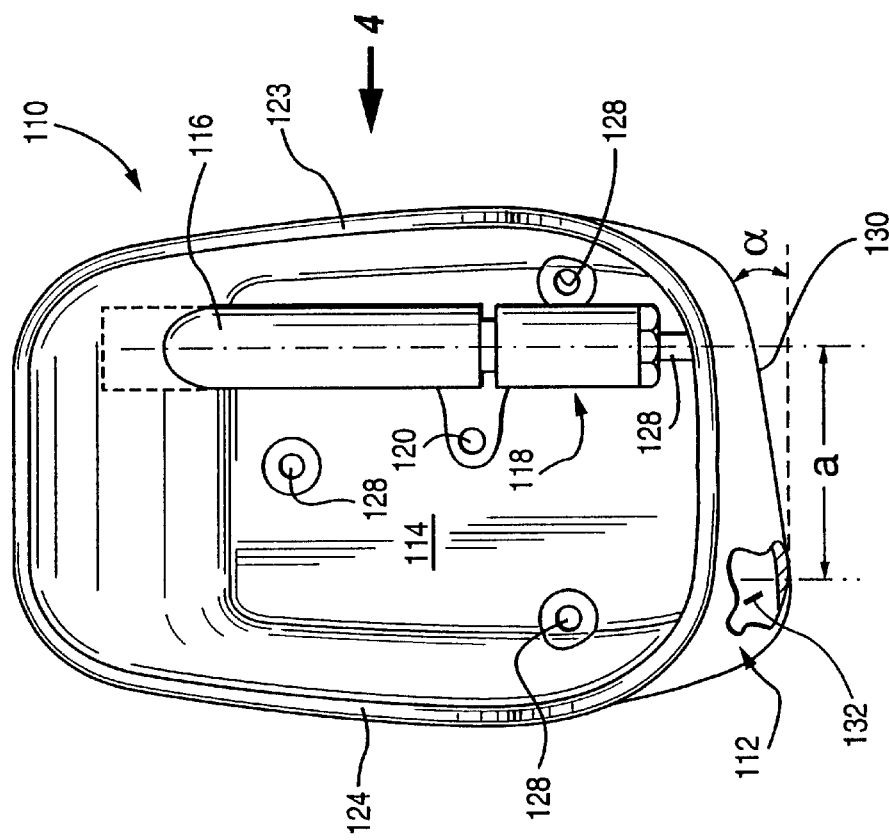

FIGS. 3 and 4 illustrate another embodiment of an exemplary animal drinking cup or bowl 110 according to the present invention. In the FIGS. 3 and 4 embodiment components comparable to those in the FIGS. 1 and 2 embodiment are shown by the same reference numeral only preceded by a "1". In the FIGS. 3 and 4 embodiment, mounting bracket 120 mounts the pipe 116 to the substantially closed rear 114 of the cup or bowl body 112, so that the actuator pin 122 is adjacent the first substantially closed side 123 of the drinker 110, and the pool-defining portion 132 is adjacent the second substantially closed side 124. Thus the downwardly slanting bottom portion 130 slants downwardly from adjacent the pin actuator 122 to the cup defining portion 132, that is moving downwardly from or adjacent the first side 123 toward the second side 124.

Figure 6:
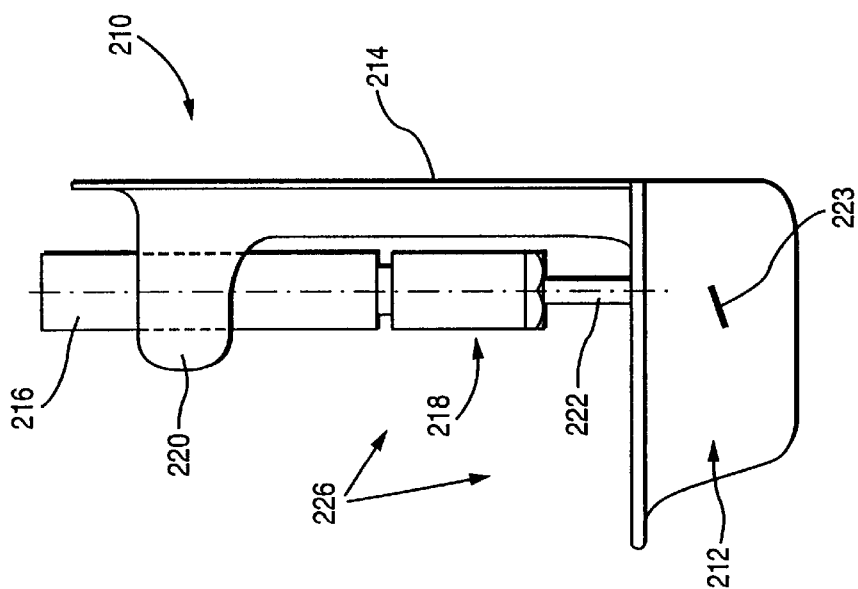
FIG. 6 is a view like that of FIG. 2 of the third embodiment.
Figure 5:
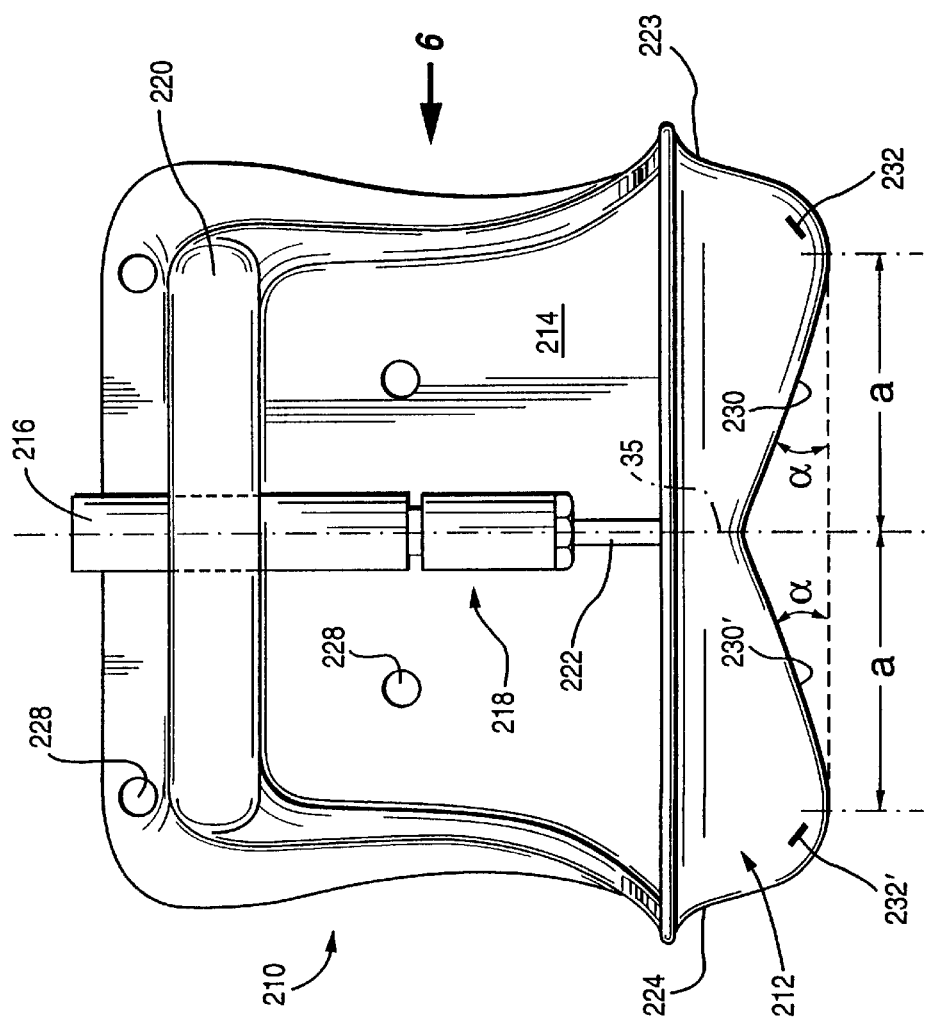
FIG. 5 is a view like that of FIG. 1 of a third embodiment.

In the embodiment of FIGS. 5 and 6 components comparable to those in the FIGS. 1 and 2 embodiment are shown by the same reference numeral only preceded by a "2". In this embodiment the nipple drinker 218 is mounted substantially in alignment with a center portion 35 of the drinker 210, and two slanted bottom portions 230, 230' are provided which may have the same or a different angle α (or contour), leading to two different pool-defining portions 232, 232'. The pool-defining portion 232 is adjacent the first side 223, while the pool-defining portion 232' is adjacent the second side 224, with both the bottom portions 230, 230' slanting downwardly from the center portion 35 towards the sides 223, 224.

While the metal cup or bowl body 12, 112, 212 according to the invention has been shown in the drawings associated with a nipple drinker 18, 118, 218 having a pin actuator 22, 122, 222, it is to be understood that other types of water supplies may be provided requiring actuation by the animal in order to dispense water, and any suitable animal-actuated water supply device may be utilized with the cup or bowl 12, 112, 212.

While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent structures and devices.

What is claimed is:

1. An animal drinking cup or bowl comprising:

a nipple drinker having a pin actuator;

a cup or bowl body mounting said nipple drinker so said pin actuator is at a first location;

said cup or bowl body having a slanted bottom portion adjacent said first location and leading downwardly to a pool-defining portion at a second location sufficiently remote from said first location so that an animal using the drinking cup or bowl substantially cannot activate said pin actuator while simultaneously drinking out of said pool-defining portion; and wherein said cup or bowl body has a substantially closed rear, first and second sides, and a substantially open front; and wherein said slanted bottom portion slants downwardly from adjacent said first side toward said second side, and said pool-defining portion is adjacent said second side; and wherein said nipple drinker is mounted adjacent said first side.

2. An animal drinking cup or bowl as recited in claim 1 wherein said slanted bottom portion makes a substantially uniform angle of greater than 4 degrees with respect to the horizontal.

3. An animal drinking cup or bowl as recited in claim 2 wherein said cup or bowl body has a substantially closed rear, first and second sides, and a substantially open front; and wherein said slanted bottom portion slants downwardly from adjacent said first side toward said second side, and said pool-defining portion is adjacent said second side; and wherein said nipple drinker is mounted adjacent said first side.

4. An animal drinking cup or bowl as recited in claim 1 wherein said nipple drinker is mounted on said rear.

5. An animal drinking cup or bowl as recited in claim 1 wherein said slanted bottom portion makes a substantially uniform angle of between about 4–10 degrees with respect to the horizontal.

6. An animal drinking cup or bowl as recited in claim 5 wherein said cup or bowl body has a substantially closed rear, first and second sides, and a substantially open front; and wherein said slanted bottom portion slants downwardly from adjacent said first side toward said second side, and said pool-defining portion is adjacent said second side; and wherein said nipple drinker is mounted adjacent said first side.

7. An animal drinking cup or bowl comprising:

a metal cup or bowl body having a substantially closed rear, first and second sides, and a substantially open front;

a substantially closed bottom having a slanted portion making an angle with respect to the horizontal of greater than about 4 degrees, and leading to a pool-defining portion; and wherein said pool-defining portion is adjacent said first side, and said slanted portion extends downwardly toward said first side.

8. An animal drinking cup or bowl as recited in claim 7 wherein said slanted and pool-defining portions are first portions; and further comprising second slanted bottom and pool-defining portions; said second pool-defining portion adjacent said second side; and wherein said first and second slanted bottom portions slant from a center portion toward said first and second sides, respectively.

9. An animal drinking cup or bowl as recited in claim 8 wherein said slanted portion makes an angle with respect to the horizontal of between about 4–10 degrees.

10. An animal drinking cup or bowl as recited in claim 7 wherein said slanted portion makes an angle with respect to the horizontal of between about 4–10 degrees.

\* \* \* \* \*